United States Patent
Grohs et al.

(10) Patent No.: US 7,317,547 B2
(45) Date of Patent: Jan. 8, 2008

(54) SINGLE COMPRESSOR WITH PLURAL DECOMPRESSORS FOR MULTI-LASER PRINTING

(75) Inventors: Randall E Grohs, Star, ID (US); Scott C. Clouthier, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 972 days.

(21) Appl. No.: 10/140,697

(22) Filed: May 7, 2002

(65) Prior Publication Data

US 2003/0210422 A1 Nov. 13, 2003

(51) Int. Cl.
*G06F 3/12* (2006.01)
*G06F 15/00* (2006.01)
*G06K 1/00* (2006.01)

(52) U.S. Cl. ........................... 358/1.15; 358/1.7

(58) Field of Classification Search .................... 399/4, 399/220, 136, 320; 358/300, 1.15, 1.13; 347/118, 224
See application file for complete search history.

(56) References Cited

U.S. PATENT DOCUMENTS

| | | | |
|---|---|---|---|
| 5,329,616 A * | 7/1994 | Silverbrook | 345/555 |
| 6,118,898 A * | 9/2000 | Chen et al. | 382/232 |
| 6,188,419 B1 * | 2/2001 | Katamoto et al. | 347/129 |
| RE37,272 E * | 7/2001 | Ochi et al. | 358/1.15 |
| 2002/0001395 A1 * | 1/2002 | Davis et al. | 382/100 |
| 2005/0251578 A1 * | 11/2005 | Kraslavsky | 709/230 |

\* cited by examiner

*Primary Examiner*—Douglas Q. Tran

(57) ABSTRACT

In a laser printer having a plurality of lasers, each of which effectuates the deposition of toner onto lines of a page to be printed, a method of printing several lines substantially simultaneously comprises storing within a single print data buffer, print data compressed using a predetermined compression methodology. The method also includes decompressing a predetermined segment of said compressed print data by one of a plurality of data de-compressors, each of which is operatively coupled to a laser that effectuates the deposition of toner onto a single line of a media.

26 Claims, 4 Drawing Sheets

US 7,317,547 B2

SINGLE COMPRESSOR WITH PLURAL DECOMPRESSORS FOR MULTI-LASER PRINTING

BACKGROUND OF THE INVENTION

In a laser printer, a beam of light from a laser is directed, typically by one or more mirrors, to impinge upon a roller so as to electrostatically charge the roller in localized areas. The laser is turned on and off as it is "aimed" by the mirror in order to selectively illuminate areas to which toner is to be selectively attached by way of electrostatic charges created on the drum surface by the laser light beam. Toner is attracted to the electrostatically charged areas, which are subsequently brought into contact with a paper thereby causing the toner to attach itself to the paper.

DETAILED DESCRIPTION OF THE PREFERRED EMBODIMENT

Figure 1:
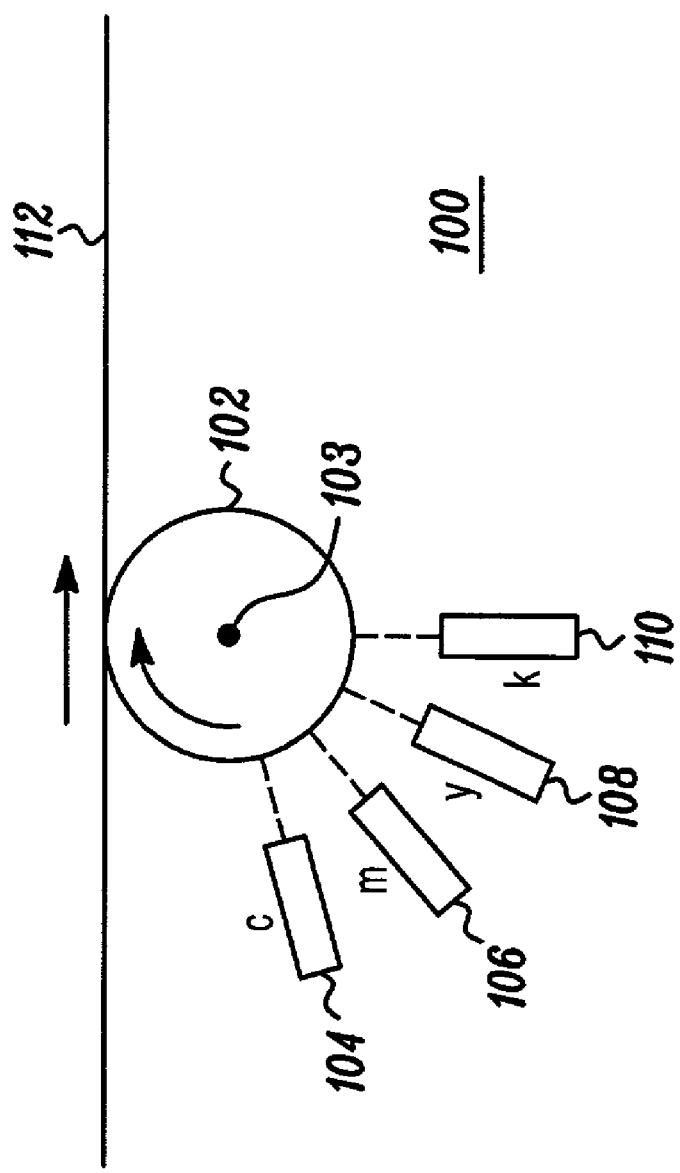
FIG. 1 shows a simplified schematic representation of a prior art four-pass color laser printer.

FIG. 1 depicts a schematic representation of a color laser printer 100. In the embodiment shown in FIG. 1, a single rotating drum 102 is illuminated by four (4) separate lasers 104, 106, 108 and 110, the optical signals from which selectively ionize surfaces of the drum 102 by which four, differently-colored toners can be electrostatically attached to the drum 102 as the drum rotates and contacts a piece of paper 112. In order to print a full-color image, each of the four lasers acts to attach a single color to the drum 102. One laser effectuates the printing of black-colored toner; another laser prints Cyanamid-color toner (cyan); a third laser prints magenta; a fourth laser prints yellow. When mixed in the right concentrations, cyanamid, magenta, yellow and black (CMYK) can be mixed to create virtually any other color of the spectrum.

The laser mechanism depicted in FIG. 1 is known as a four-pass color printer (or N-pass printer, where in FIG. 1, N=4) because four separate rotations of the drum 102 are required to paint the four colors, cyan, magenta, yellow, and black (represented by the lower case letter k) onto the single drum 102.

By using multiple rotations of the drum, four differently-colored toners can be electrostatically deposited onto the drum (or onto a belt that contacts the drum) and then onto the paper 112 yielding a multi-color image on the paper 112 by causing the paper to repeatedly pass over the drum (or the aforementioned belt).

Not shown in FIG. 1 for simplicity are rotating laser control mirrors, the rotation of which directs the beam from the fixed lasers onto different lateral positions of the drum as the drum rotates. Also not shown in FIG. 1 is the control circuitry by which the data that controls the lasers is directed to each of the separate four lasers from a printer. The control mirrors and control circuitry are well-known in the art.

A problem with the single drum color laser printer such as that of FIG. 1 is the speed at which pages are output from such a device. The lasers 104, 106, 108, and 110 can only "paint" a single horizontal line of the drum 102 as it rotates about its axis 103. The beam from laser 104 for example (the cyan laser) must paint an entire line across the width of the drum 102 under the control of a processor or other circuit. Upon concluding a first line, the laser must be re-aimed and re-energized to paint a successive line across the width of the drum. In other words, each laser can only print one line at a time.

In addition, in a four-pass, full-color printer, four passes of the page across the drum are required to completely paint a page with each page requiring a full drum rotation. On the rotation of each drum 102, each color gun (laser) must be appropriately activated so as to deposit the requisite amounts of the c, m, y and k components of onto the drum and, in turn, onto paper 112.

One way to improve print speed is to use multiple lasers to print successive lines of each color on each rotation. With respect to the structure shown in FIG. 1, if two lasers were used for each of the c, m, y, and k colors, a first laser could paint one line across the drum 102. If the second laser is positioned so as to immediately print an adjacent line across the drum 102, the printing time required for each color, and hence for paper 112, might be reduced by a factor of two. By using three, four, five or more lasers, each of which paints an adjacent horizontal line across the drum 102 the time required to electrostatically energize the drum 102, pick up colored toner, and deposit the colored toner onto the paper 112 might be reduced significantly. As the number of lasers increases however, their cumulative costs increase and the circuitry to control the leasers becomes increasingly complex.

Figure 2:
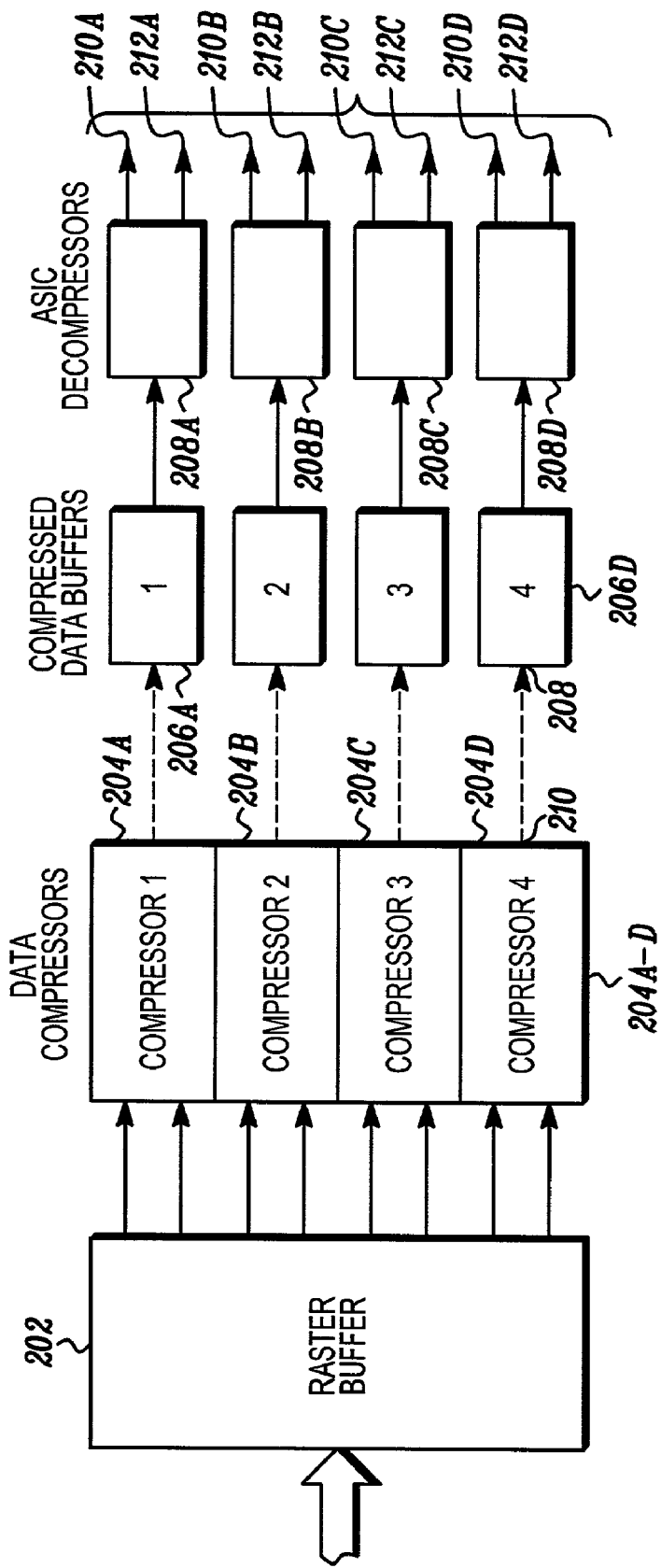
FIG. 2 shows a simplified schematic depiction of the circuitry used to control multiple lasers in a color laser printer of the prior art.

FIG. 2 depicts a representation of a prior art control circuit by which rasterized image data is compressed, stored, and decompressed so as to control multiple lasers in a four pass color laser printer. In FIG. 2, rasterized image data, (created using processes well known in the prior art and which are known to be much faster than printer mechanisms can accommodate) is stored in a raster buffer 202 (typically implemented using a semiconductor random access memory (RAM) but also possibly implemented using other storage media such as magnetic disk).

Rasterized image data stored in the raster buffer 202 is read from the buffer and conveyed to four separate data compressors 204a-204d, possibly implemented using a microprocessor or microcontroller, combinational and sequential logic, implemented as appropriate, perhaps implemented on an application specific integrated circuit (ASIC), or even a suitably programmed digital signal processor (DSP), each of which operates on only a predetermined segment of the raster image data stored in the raster buffer 202. The data compressors 204a-204d compress the raster image data according to a predetermined methodology, JPEG for example.

The data from the data compressors 204a-204d is sent to corresponding compressed data buffers 206a-206d, each of which has an input 208 coupled to an output 210 of a corresponding one of data compressors 204a-204d. The compressed data buffers 206a-206d transfer their respective data (either by the buffer "sending" the data or another device "reading" data from the buffer) into corresponding ASIC decompressors 208a-208d, the outputs of which (210 and 212) are used to drive or control lasers and their associated mirrors, such as those schematically depicted in FIG. 1.

Heretofore, it had been thought that by splitting the task of compressing the rasterized data into several pieces that a computational advantage would be realized. Lower-speed, i.e. cheaper, data compressors and de-compressors could be used, yielding a lower manufacturing cost for a multi-laser printer. A problem with the topology of the prior art circuitry shown in FIG. 2 is that when the raster image data stored in the raster buffer 202 is directed into four different data compressors 204a-204d, a consequence of splitting the rasterized image data into four separate components, is that each compressor causes some non-zero amount of image distortion—simply because of the act of compressing the image data. The subsequent decompressions introduce yet more distortion than would be apparent if the rasterized image data were not split into different pieces for compression, storage, decompression, and printing. Stated alternatively, the act of compressing an image in a non-sequential manner causes output image distortion.

A method and apparatus by which multiple lasers could be controlled in a multi-laser color printer such that the error introduced in an image and the image data from processing is reduced would be an improvement of the prior art.

Figure 3:
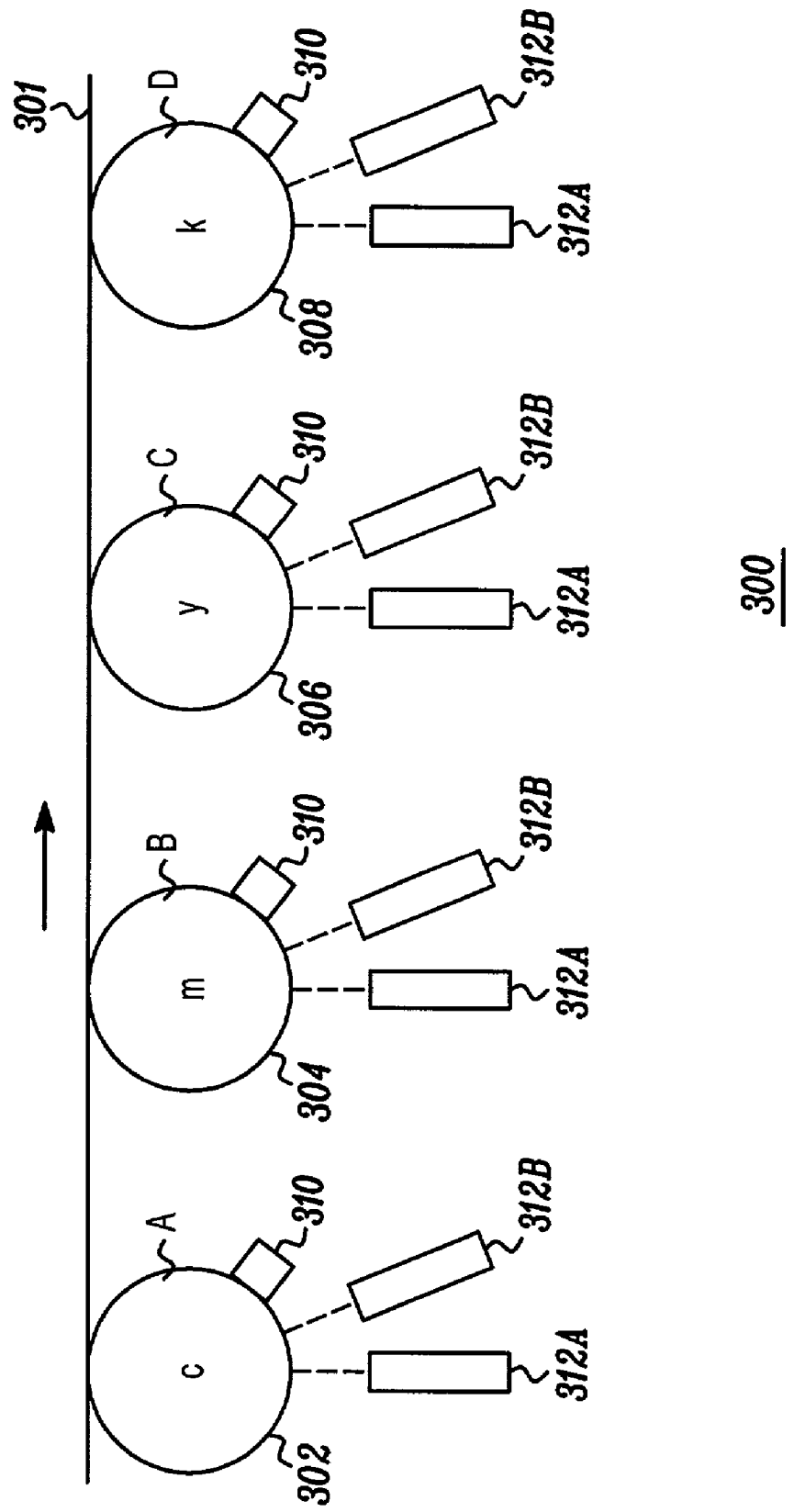
FIG. 3 shows a simplified representation of an in-line, multi-drum color laser printer, each drum of which is electrostatically charged by two or more lasers.

FIG. 3 shows a schematic diagram of the conceptual configuration of a multiple-laser color printer known as an in-line laser printer 300. Media 301, such as paper, transparent film, or other media onto which an image is to be printed, contacts four separate print rollers 302, 304, 306, and 308 under the action of driver rollers of the printer (not shown in FIG. 3). Each of the print rollers 302, 304, 306, and 308 obtains a single toner color from an associated toner supply (also not shown) and in turn, applies the single color toner to one side of the media 301. As is known in the art, a virtually full-color image can be produced by mixing appropriate amounts of c, m, y, and k colors together and in FIG. 3, the c, m, y, and k components are effectively mixed, on the media 301 by successively passing the media 301 over each roller in turn, thereby yielding a full color image on the media 301.

Roller 302 is arbitrarily designated in FIG. 3 to apply cyan-colored toner; roller 304 is arbitrarily designated in FIG. 3 as applying magenta-colored toner; roller 306 is to apply yellow-colored toner, and roller 308 applies black toner. Alternate and equivalent embodiments could apply c, m, y, and k to a media 301 in different sequences.

Like prior art laser printers that effectuate the deposition of toner onto media, each of the rollers 302, 304, 306, and 308 effectuates the application of toner from a reservoir 310 by electrostatic charges created on the roller surfaces by two separate lasers 312A and 312B that are "assigned" to each roller 302, 304, 306, and 308. (The toner reservoirs are not shown in FIG. 3 because they are not considered to be germane to an understanding of the subject matter disclosed and claimed herein.) In FIG. 3, as a design choice, the lasers 312A and 312B are "paired" such that two lasers are "assigned" to each roller. Each "A" laser paints a single line across a roller while each "B" laser paints an adjacent line so as to irradiate successively adjacent lines as the rollers rotate. By using two or more lasers on each rotating drum or roller 302, 304, 306 and 308, more print data can be processed so as to effectuate toner deposition on the drums faster and as a result, pages can be printed faster. Alternate embodiments would include using only a single laser on each roller. Yet another alternate embodiment uses three or more lasers on each roller. Another, embodiment could use a different number of lasers assigned to each roller. In embodiments where multiple lasers are used, each laser is activated and "steered" onto localized regions of "lines" across the width of the rollers, preferably using mirrors, as the rollers rotate according to data that is initially stored as rasterized image data. Using multiple lasers on each roll increases speed at which an image, which is represented by the rasterized image data, can be laid down onto a media 301.

As depicted in FIG. 3, each of the rollers 302, 304, 306, and 308 is electrostatically charged using two lasers, 312A and 312B. Inasmuch as each roller is used to deposit only a single color, when a particular color is supposed to be attached to the media 301 (as determined by the rastenzed image data) at least one of the lasers (312A or 312B) is modulated. A first laser, 312A for instance, paints one line across the width of the roller while a second laser 312B, can be either positioned or aimed so as to irradiate another line on the drum that is radially adjacent the line painted by the first laser, paints an immediately adjacent, second line. In operation, laser 312A might paint even-numbered lines with laser 312B painting odd-numbered lines. Whether an "A" laser or "B" laser prints first is a design choice. When multiple lines are being painted, the lasers can be actuated simultaneously as well.

The modulation of the lasers 312A and 312B is in response to rasterized image data that is generated by an application program, such as a drawing program like one or more of such programs offered by Adobe Systems, Inc. Rasterized image data can also originate from other sources such as a scanner. The rasterized image data is used to turn the print-effectuating lasers 312A and 312B, on and off such that the cooperating rotating mirrors (not shown for clarity) and the laser electrostatically charge a roller in appropriate positions such that when toner is brought into contact or close proximity to those positions, toner is attached at those positions and can be subsequently deposited onto the media 301 in order to yield an image.

As set forth above, increased print speeds can be accomplished by using multiple lasers to print multiple lines on a laser roller. Effectively controlling multiple lasers can become problematic however when each laser is controlled using decompressed data that was compressed using multiple, separate data compressors.

Figure 4:
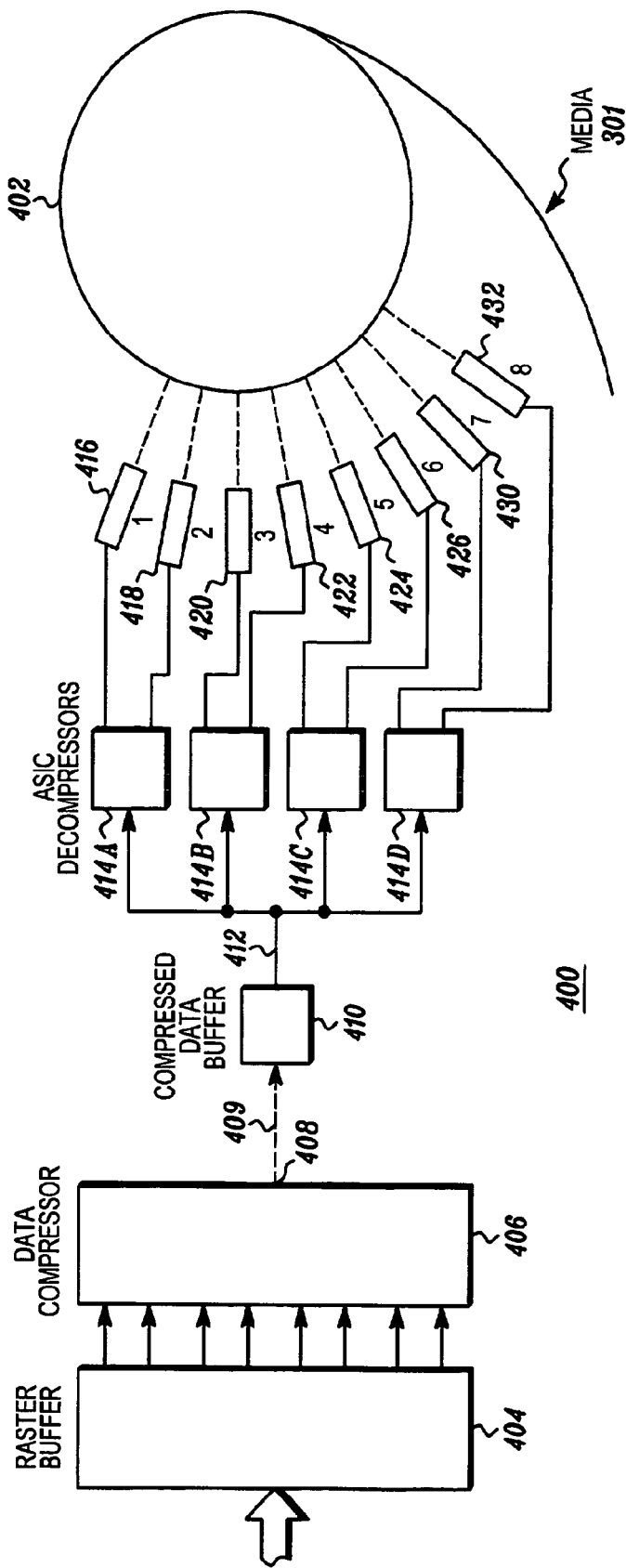
FIG. 4 is a simplified schematic diagram of a portion of a laser printer, including the structure for controlling the distribution of raster image data in a multi-laser in-line color laser printer.

FIG. 4 depicts a simplified representation of a portion of a laser printer 400 that is the control circuitry used to control multiple lasers on a single laser print roller 402. Data from a single data compressor 406, which obtains (reads) data from a raster image buffer 404 is compressed according to a data compression algorithm and transferred to multiple, parallel, complementary de-compressors 414A-414D. The de-compressors are considered to be complementary since each decompress the compressed raster image data using an inverse of the algorithm used to compress the data.

Raster buffer 404 receives raster image data from other processes, well-known in the art and not disclosed herein for clarity. Unlike the prior art laser printer control circuitry that uses multiple data compressors to operate on raster image data in parallel with each other, the raster image data stored in the raster buffer 404 is compressed by only a single print data compressor 406, using any appropriate data compression algorithm such as JPEG, JPEGLS, Limpel-ziv, and JPEG2000. The compressed data is transferred into the raster buffer 404 from the data compressor 406 under the control of the data compressor 406. Data compressor 406 can be implemented using a microprocessor, microcontroller, ASIC, DSP or other computationally device.

The single print data compressor 406 processes all of the rasterized image data (also considered to be "rasterized print data") corresponding to an image (text as well as graphics) to be printed. By using a single data compressor 406, which sequentially compresses all of the rasterized image data, the number of errors that are introduced in the compressed data output stream is significantly less than the prior art methods. As a result, output image distortion is reduced. The output from the single data compressor 406, which appears at a single output 408 is transferred to a single compressed print data buffer 410 whereat the compressed rasterized image data can be stored limiting the number of data operations to only two: compression and decompression.

It should be noted that the output of the print data compressor 406 is a stream of compressed data, which is considered to be "compressed print data." The form of this data stream can be sequentially generated, multi-bit data words the individual binary digits (bits) of which appear in parallel on several parallel data paths. Data output from the print data compressor 406 can also take the form of a serial bit stream, either synchronous or asynchronous.

The single compressed print data buffer 410 has an output 412 coupled to each of the inputs of four, separate ASIC decompressors 414A-414D. Each of the decompressors 414A-414D receives the same compressed print data from the compressed data buffer 410, however, the decompressors do not decompress the same data. The ASIC decompressors 414A-D are implemented and/or programmed to decompress only portions of the compressed rasterized image data that corresponds to the line of an image that the a decompressor's associated laser will print. Alternative and equivalent embodiments would include transferring to a particular decompressor from the compressed data buffer 410, only compressed image data which upon decompression corresponds to the picture elements (pixels) for a particular line of an image that a decompressor is supposed to "transfer" to it's associated laser(s).

As shown in FIG. 4, the decompressor 414A has two outputs each of which is effectively used to "drive" a separate laser 416 and 418 so as to cause the lasers to energize at appropriate times so as to effectuate the appropriate deposition of toner onto the drum 402. The decompressor 414B also has two outputs, each of which drives a single laser 420 and 422. Similarly, decompressor 414C drives lasers 424 and 426. Finally, decompressor 414D drives lasers 430 and 432.

Each of the lasers 416-432 paints only one line at a time across with width of the roller 402. Laser 416, for example, paints one line while adjacent laser 418 paints an adjacent line across the width of the drum 402. Similarly the lasers 420, 422, 424, 426, 430, and 432 each paint another adjacent line across the width of the drum 402. The decompressors that control the lasers only operate on data for the lasers each decompressor controls by counting compressed data from the compressed data buffer. By way of example, if a line of print requires one hundred bytes of compressed data, the decompressor required to print the first line of an image will decompress the first one-hundred bytes. The decompressor that prints the second line will count off the first one-hundred bytes and begin decompression of only the second one-hundred bytes from the buffer.

In the embodiment shown in FIG. 4, by configuring eight separate lasers, each of which electrostatically energizes only one "line" of a rotating laser printer drum 402, the speed at which the surface of the drum 402 can be electrostatically energized so as to pick up toner for deposition on a paper can be substantially increased. An increase in print speed is realized by having each of the ASIC decompressors 414A-414D decompress only portions of the data sent to it from the compressed data buffer 410 that correspond to the two lines on the print drum 402 which the decompressor needs to "paint" onto the drum.

By way of example, decompressor 414A is programmed to decompress only the data from the compressed data buffer 410 from which the decompressor generates the first two lines of information for the drum 402 and which are painted onto the drum by lasers 416 and 418. The decompressor 414A can do this by counting down the number of data words sent from the compressed data buffer 410 corresponding to the number of picture elements that the lasers 416 and 418 need to consider in painting the width of the roller drum 402.

By way of further example, if the drum 402 has 100 picture elements across its width, and if each picture element requires one byte of data sent to the lasers 416 or 418 to paint, decompressor 414a might decompress the first 100 bytes of data for the first line, the second 100 bytes of data for the second line, and thereafter ignore the next 600 bytes for lines 3-8, which are to printed by lasers 420, 422, 424, 426, 430, and 432, which are under the control of ASIC decompressors 414B, 414C, and 414D respectively.

The topology of the control circuit depicted in FIG. 4 is superior to the prior art by using only the single print data compressor and a single print data buffer. When increasing print speed by using multiple, independently controlled lasers, prior art circuits that use multiple, separate data compressors inherently introduce error in the printed output by segmenting up the raw, rasterized image data from the raster buffer 404 when that data is sent to separate data compressors. Instead, using the topology depicted in FIG. 4, the output of the data compressor 406 is a continuous stream of data which can be evenly distributed without discontinuities of data being sent to the decompressors. Stated alternatively, each of the decompressors receives the same data and then selects which of the compressed data it will decode after decompression so as to produce a smoother yet faster output.

Those of skill in the art will recognize that different numbers of lasers can be used to deposit toner and that different numbers of lasers can be used to deposit colored toners as well. Lasers 416 and 418 could be used to deposit cyan while lasers 420 and 422 deposit magenta and lasers 424 and 426 deposit yellow while lasers 430 and 432 deposit black toner. In addition to using two lasers for each color, one, three, four or more lasers could be used as well.

While the embodiment depicted in FIG. 4 finds application in laser printers used with personal computers, this embodiment also finds application in large scale commercial printing. The print engines controlled by the ASIC decompressors 414A-414D might be located at a large, commercial-sized printer with the print data being sent from the data compressor via data networks such as a local area network or by way of the Internet. The data link 409 coupling the data compressor 406 to the compressed data buffer 410 therefore can be an individual trace in an integrated circuit, on a circuit board (in the case of a local printer) however it might also be a switching network or Ethernet network by which considerable distance would separate the data compressor from the compressed data buffer 410.

Those of skill in the art will recognize that while the embodiment shown in FIG. 4 shows a single drum to which there are aimed eight lasers, alternate embodiments of the invention would include using one, three or more lasers for each color that is deposited onto media using the single drum.

While the invention finds particular application in an in-line printer, wherein several lasers might be used to paint individual rollers, the invention would find application in a multi-pass or four-pass printer in the prior art by having the four lasers that individually paint a single roller controlled by the four separate decompressors as well.

What is claimed is:

1. A method of sending rasterized print data to a plurality of lasers in a laser printer comprising the steps of:
   compressing rasterized print data from a print data buffer by a single print data compressor, said print data compressor having a compressed print data output;
   storing compressed print data in a single, compressed print data buffer;
   transferring segments of the compressed print data in said compressed print data buffer to individual ones of a plurality of data decompressors;
   at each of said decompressors, selectively decompressing said compressed print data into rasterized print data to control a predetermined one of said plurality of lasers, wherein only data associated with the predetermined one of said plurality of lasers is decompressed;
   using the print data to deposit a first line across a width of a first roller of the laser printer with a first plural set of lasers while simultaneously aiming a second plural set of lasers to irradiate and deposit a second line that is radially adjacent to the first line on a second roller of the laser printer, wherein the first and second lines are irradiated as successively adjacent lines as the rollers rotate;
   steering each laser onto localized regions of the lines across the width of the rollers as the rollers rotate based on the rasterized print data so that each of the plural lasers paints only one line at a time across the width of the roller while an adjacent laser paints an adjacent line across the width of the roller; and
   using the decompressors to count down a number of data words received as the compressed print data from the print data comprerssor corresponding to a number of picture elements that the plural lasers consider when painting the width of a roller after selectively decompressing the compressed print data.

2. In a laser printer having a plurality of lasers, each of which effectuates the deposition of toner onto single lines of a page to be printed, a method of sending rasterized print data to said plurality of lasers comprising the steps of:
   compressing print data using a single data compressor which compresses rasterized print data according to a data compression methodology, said single data compressor having an output from which compressed rasterized print data is output;
   storing said compressed rasterized print data from said single data compressor to a single, compressed rasterized print data buffer;
   transferring predetermined portions of said compressed rasterized print data from said buffer to a plurality of data decompressors;
   at each of said decompressors: selectively decompressing said compressed print data into rasterized print data, wherein only data associated with a predetermined one of an associated laser is decompressed;
   using the print data to deposit a first line across a width of a first roller of the laser printer with a first plural set of lasers while simultaneously aiming a second plural set of lasers to irradiate and deposit a second line that is radially adjacent to the first line on a second roller of the laser printer, wherein the first and second lines are irradiated as successively adjacent lines as the rollers rotate;
   steering each laser onto localized regions of the lines across the width of the rollers as the rollers rotate based on the rasterized print data so that each of the plural lasers paints only one line at a time across the width of the roller while an adjacent laser paints an adjacent line across the width of the roller;
   using the decompressors to count down a number of data words received as the compressed print data from the print data comprerssor corresponding to a number of picture elements that the plural lasers consider when painting the width of a roller after selectively decompressing the compressed print data; and
   printing a predetermined line of a page to be printed from said print data and discarding other rasterized print data.

3. The method of claim 2 wherein said data compression methodology is JPEG.

4. The method of claim 2 wherein said data compression methodology is JPEGLS.

5. The method of claim 2 wherein said data compression methodology is Limpel-Ziv.

6. The method of claim 2 wherein said data compression methodology is JPEG 2000.

7. A method of sending rasterized print data to said plurality of lasers in a laser printer comprising the steps of:
   compressing rasterized print data from a print data buffer using a single data compressor which compresses rasterized print data according to a data compression methodology, said single data compressor having a compressed data output port from which compressed rasterized print data is output;
   transferring serial compressed rasterized print data from said single data compressor into a single, compressed print data buffer via a data network;
   selectively decompressing by each decompressor the compressed print data into rasterized print data, wherein only data associated with a predetermined one of an associated laser is decompressed;
   using the print data to deposit a first line across a width of a first roller of the laser printer with a first plural set of lasers while simultaneously aiming a second plural set of lasers to irradiate and deposit a second line that is radially adjacent to the first line on a second roller of the laser printer, wherein the first and second lines are irradiated as successively adjacent lines as the rollers rotate;
   steering each laser onto localized regions of the lines across the width of the rollers as the rollers rotate based on the rasterized print data so that each of the plural lasers paints only one line at a time across the width of the roller while an adjacent laser paints an adjacent line across the width of the roller; and
   using the decompressors to count down a number of data words received as the compressed print data from the print data comprerssor corresponding to a number of picture elements that the plural lasers consider when painting the width of a roller after selectively decompressing the compressed print data.

8. The method of claim 7 wherein said data compression methodology is JPEG.

9. The method of claim 7 wherein said data compression methodology is JPEGLS.

10. The method of claim 7 wherein said data compression methodology is Limpel-Ziv.

11. The method of claim 7 wherein said data compression methodology is JPEG 2000.

12. In a laser printer having a plurality of lasers, each of which effectuates the deposition of toner onto lines of a page to be printed, a method of printing several lines substantially simultaneously comprising the steps of:

storing within a single print data buffer, print data compressed using a predetermined compression methodology;

selectively decompressing a predetermined segment of said compressed print data by one of a plurality of data de-compressors, each of which is operatively coupled to a laser that effectuates the deposition of toner onto a single line of a media, wherein only data associated with a predetermined one of an associated laser is decompressed;

using the print data to deposit a first line across a width of a first roller of the laser printer with a first plural set of lasers while simultaneously aiming a second plural set of lasers to irradiate and deposit a second line that is radially adjacent to the first line on a second roller of the laser printer, wherein the first and second lines are irradiated as successively adjacent lines as the rollers rotate;

steering each laser onto localized regions of the lines across the width of the rollers as the rollers rotate based on the rasterized print data so that each of the plural lasers paints only one line at a time across the width of the roller while an adjacent laser paints an adjacent line across the width of the roller; and using the decompressors to count down a number of data words received as the compressed print data from the print data comprerssor corresponding to a number of picture elements that the plural lasers consider when painting the width of a roller after selectively decompressing the compressed print data.

13. The method of claim 12 wherein said data compression methodology is JPEG.

14. The method of claim 12 wherein said data compression methodology is JPEGLS.

15. The method of claim 12 wherein said data compression methodology is Limpel-Ziv.

16. The method of claim 12 wherein said data compression methodology is JPEG 2000.

17. An apparatus for controlling the deposition of toner onto a printed page by multiple lasers with improved image quality comprised of:

a rasterized print data buffer;

a single data compressor coupled to said rasterized print data buffer and compressing said rasterized image data according to at least one predetermined method;

a plurality of compressed raster image data decompressors, each decompressor being coupled to said single data compressor and receiving therefrom compressed raster image data, each decompressor controlling a laser that effectuates the deposition of a line of toner onto a printed page according to a predetermined segment of said compressed raster image data, wherein only data associated with a predetermined one of the plurality of lasers is selectively decompressed by an associated decompressor;

a first plural set of lasers that uses the print data to deposit a first line across a width of a first roller of the laser printer while a second set of plural lasers is simultaneously aimed to irradiate and deposit a second line that is radially adjacent to the first line on a second roller of the laser printer, wherein the first and second lines are irradiated as successively adjacent lines as the rollers rotate; and steering each laser onto localized regions of the lines across the width of the rollers as the rollers rotate based on the rasterized print data so that each of the plural lasers paints only one line at a time across the width of the roller while an adjacent laser paints an adjacent line across the width of the roller; and a counter configured to count down a number of data words received as the compressed print data from the single data compressor corresponding to a number of picture elements that the plural lasers consider when painting the width of a roller after selectively decompressing the compressed print data.

18. The apparatus of claim 17 wherein said data predetermined method is JPEG.

19. The apparatus of claim 17 wherein said data predetermined method is JPEGLS.

20. The apparatus of claim 17 wherein said data predetermined method is Limpel-Ziv.

21. The apparatus of claim 17 wherein said data predetermined method is JPEG 2000.

22. A laser printer having multiple lasers with improved image quality comprised of:

a rasterized print data buffer;

a single data compressor operatively coupled to said rasterized print data buffer, said single data compressor compressing said raster image data according to at least one data compression methodology;

a compressed raster image data buffer, operatively coupled via a network to said single data compressor output and storing compressed raster image data received from said single data compressor;

a plurality of compressed raster image data decompressors, each being operatively coupled to said compressed raster image data buffer, each decompressor selectively decompressing only a segment of said compressed raster image data, thereby effectuating the deposition of only a single line of toner onto a media according to a predetermined segment of said compressed raster image data, wherein only data associated with a predetermined one of the plurality of lasers is selectively decompressed by an associated decompressor;

a first plural set of lasers that uses the print data to deposit a first line across a width of a first roller of the laser printer while a second set of plural lasers is simultaneously aimed to irradiate and deposit a second line that is radially adjacent to the first line on a second roller of the laser printer, wherein the first and second lines are irradiated as successively adjacent lines as the rollers rotate;

steering each laser onto localized regions of the lines across the width of the rollers as the rollers rotate based on the rastenzed print data so that each of the plural lasers paints only one line at a time across the width of the roller while an adjacent laser paints an adjacent line across the width of the roller; and using the decompressors to count down a number of data words received as the compressed print data from the print data comprerssor corresponding to a number of picture elements that the plural lasers consider when painting the width of a roller after selectively decompressing the compressed print data.

23. The laser printer of claim 22 wherein said data predetermined method is JPEG.

24. The laser printer of claim 22 wherein said data predetermined method is JPEGLS.

25. The laser printer of claim 22 wherein said data predetermined method is Limpel-Ziv.

26. The laser printer of claim 22 wherein said data predetermined method is JPEG 2000.

* * * * *

UNITED STATES PATENT AND TRADEMARK OFFICE
CERTIFICATE OF CORRECTION

PATENT NO. : 7,317,547 B2 Page 1 of 1
APPLICATION NO. : 10/140697
DATED : January 8, 2008
INVENTOR(S) : Randall E. Grohs et al.

It is certified that error appears in the above-identified patent and that said Letters Patent is hereby corrected as shown below:

In column 4, line 14, delete "rastenzed" and insert -- rasterized --, therefor.

In column 7, line 42, in Claim 1, delete "comprerssor" and insert -- compressor --, therefor.

In column 8, line 14, in Claim 2, delete "comprerssor" and insert -- compressor --, therefor.

In column 8, line 60, in Claim 7, delete "comprerssor" and insert -- compressor --, therefor.

In column 9, line 35, in Claim 12, delete "comprerssor" and insert -- compressor --, therefor.

In column 10, line 4, in Claim 17, after "rotate;" delete "and".

In column 10, line 58, in Claim 22, delete "rastenzed" and insert -- rasterized --, therefor.

In column 10, line 64, in Claim 22, delete "comprerssor" and insert -- compressor --, therefor.

Signed and Sealed this

Twenty-seventh Day of May, 2008

JON W. DUDAS
*Director of the United States Patent and Trademark Office*